United States Patent
Rose

(10) Patent No.: US 6,411,249 B1
(45) Date of Patent: Jun. 25, 2002

(54) APPARATUS AND METHOD FOR THE MONOPULSE LINKING OF FREQUENCY AGILE EMITTER PULSES INTERCEPTED IN ON SINGLE INTERFEROMETER BASELINE

(75) Inventor: Conrad Rose, King George, VA (US)

(73) Assignee: Northrop Grumman Corporation, Los Angeles, CA (US)

(*) Notice: Subject to any disclaimer, the term of this patent is extended or adjusted under 35 U.S.C. 154(b) by 73 days.

(21) Appl. No.: 09/619,474

(22) Filed: Jul. 19, 2000

(51) Int. Cl.[7] .............................................. G01S 7/40
(52) U.S. Cl. .......................... 342/13; 342/147; 342/156
(58) Field of Search ............................ 342/13, 89, 98, 342/102, 147, 149, 156, 162, 195

(56) References Cited

U.S. PATENT DOCUMENTS

| | | | | |
|---|---|---|---|---|
| 4,627,075 A | * | 12/1986 | Fleming, III et al. | 375/239 |
| 4,628,312 A | * | 12/1986 | Hwang et al. | 340/825.64 |
| 4,700,191 A | * | 10/1987 | Manor | 342/13 |
| 4,721,958 A | * | 1/1988 | Jenkin | 342/13 |
| 4,734,702 A | | 3/1988 | Kaplan | 342/424 |
| 4,816,834 A | * | 3/1989 | Bjorke | 342/120 |
| 4,973,968 A | * | 11/1990 | Hurd | 342/137 |
| 5,036,325 A | * | 7/1991 | O'Brien | 342/160 |
| 5,063,385 A | * | 11/1991 | Caschera | 342/13 |
| 5,091,917 A | | 2/1992 | Udd et al. | 375/10 |
| 5,343,212 A | | 8/1994 | Rose et al. | 342/424 |
| 5,422,646 A | * | 6/1995 | Lewis | 342/160 |
| 5,530,448 A | * | 6/1996 | Lewis | 342/132 |
| 5,563,806 A | * | 10/1996 | Barry et al. | 702/190 |
| 5,614,912 A | * | 3/1997 | Mitchell | 342/146 |
| 5,731,783 A | * | 3/1998 | Graham | 342/188 |
| 6,225,943 B1 | * | 5/2001 | Curley et al. | 342/137 |

* cited by examiner

Primary Examiner—John B. Sotomayor
(74) Attorney, Agent, or Firm—Lowe Hauptman Gilman & Berner, LLP

(57) ABSTRACT

Disclosed is a method of associating a single pulse from an agile emitter with previously detected pulses from that emitter in a time interval less than the pulse repetition interval (PRI) of the radar. Ambiguous phases from the previously detected pulses from the same agile emitter are stored. A single cos(aoa) from a subset of the stored ambiguous phases is estimated. A new ambiguous phase $\phi_m$ at frequency $f_m$, is detected. This frequency is different from at least one of the frequencies associated with the phases in the stored set. The phase measurement is made between two antennas spatially separated by distance d. A set of differenced phases is formed and corresponding differenced frequencies from the stored set, with at least one member of this set being the difference of the new ambiguous phase and frequency with one of the stored phases and its associated frequency. The phase cycle measurement ambiguity integer is measured resolving the phase difference formed from the new ambiguous phase utilizing this set of phase and frequency differences. The phase cycle measurement ambiguity integer is computed resolving the new ambiguous phase difference if the new pulse is from the same emitter as the stored set by utilizing the previously estimated cos(aoa) and newly measured frequency $f_m$. The measured and computed ambiguity integers are compared. The newly detected pulse is associated with the previously stored pulses as being from the frequency agile emitter if the integers are equal.

20 Claims, 3 Drawing Sheets

APPARATUS AND METHOD FOR THE MONOPULSE LINKING OF FREQUENCY AGILE EMITTER PULSES INTERCEPTED IN ON SINGLE INTERFEROMETER BASELINE

FIELD OF THE INVENTION

The present invention relates generally to intercept receivers, and more particularly, to frequency agile emitters used in radar systems.

BACKGROUND OF THE INVENTION

Electronic Surveillance Measures (ESM) intercept receivers are used to collect radar data, and in particular to perform a pulse parameter measurement function. Pulse parameter measurements are used to type or "fingerprint" radar systems. The measurements taken by the ESM receiver include the traditional parameters such as pulse time of arrival (TOA), pulse width (PW), signal amplitude and carrier frequency, and so-called pulse internals such as modulation. Modulation measurements involve, for frequency agile radars, finding the minimum and maximum frequencies, time between the minimum and maximum frequencies, and the number of frequency steps for both LFM (linear frequency modulation, or chirp) and FSK (frequency-shift-keyed) signals. All these, and other electronic intelligence (ELINT) measurements are most accurate when performed on many pulses and statistically combined. Therefore the controller for the ESM receiver operated in an ELINT mode may direct a continuous tune to collect data for a single radar over several minutes.

The controller directs the receiver to tune to a certain center frequency. This is called a "dwell". During a dwell, all pulses with RF carrier frequencies falling in the receiver bandwidth centered at the tune frequency are collected, sorted and processed. When fingerprinting, the sorting must occur in microseconds to assure enough pulses are stored to allow processing of sufficient contiguous pulses from the same radar. Such screening can rely on only one or two parameters. For fixed frequency radars the sorting parameter is typically RF carrier frequency. But frequency as a sorting parameter is not useful for frequency agile radars.

Radars use frequency agility either as an electronic counter countermeasure (ECCM), or to enhance performance. As an example of performance use, many sea borne radars have a frequency change every 10 ms to 100 ms to electronically steer the antenna beam. An example of ECCM use is frequency hopping within a bandwidth, possibly extending over 1 GHz, to reduce the vulnerability of surface-to-air missile systems to jamming.

As these two examples indicate, the change in transmitted frequency can be on a pulse-by-pulse or pulse-batch to pulse-batch basis, with the RF carrier frequency of the pulse perturbed in either a random or preprogrammed fashion. But even if deterministic at the transmitter, the frequency change schedule is typically such that the frequency of the next pulse or pulse group cannot be reliably predicted from the frequency of the current pulse by ESM processing.

Therefore in current systems the ESM receiver control must direct a wideband tune to capture pulses contiguous in time from frequency agile radar. But then the number of pulses for a particular agile radar that can be sampled and stored is limited since so many pulses from other radars in the environment will be collected. In fact, with a wideband tune the number of pulses stored from a single agile emitter is generally too small to do precision parameter extraction.

The linking of frequency agile pluses is called dehopping. The traditional way to use interferometer measured phase for dehopping is with a multichannel system generating the emitter angle-of-arrival or aoa from a single pulse. But implementing this is cumbersome since typically at least five channels are needed to generate sufficiently accurate aoa for sorting; i.e. five separate receivers are required to measure monopulse phase across four different interferometer baselines. Since, in an effort to limit both weight and cost, many recent ESM systems now incorporate only two channel receivers, such as Litton Industries Advanced Systems Division's LR-100 ESM Receiver, this conventional interferometer monopulse approach to dehopping is typically not available, and an alternative must be found.

A commonly tried alternative to using multichannel generated aoa for monopulse sorting is the use of pulse repetition interval (PRI) tracking and prediction. But radars use a variety of ECCM techniques, especially against jammers, that have the secondary consequence of rendering PRI tracking useless. For example, some radar time jitter their pulses. And some radar, in particular, many airborne radars, may operate in an agile-agile mode. That is, the radar can vary both the carrier frequency and the pulse repetition frequency. Therefore, sorting by PRI, i.e. predicting a time window for the next pulse based on a stable pulse-time interval model (using, for example, some variant of the approach described by Udd et al in U.S. Pat. No. 5,091,917 "Method and Apparatus for Pulse Sorting"), is, for a large and important class of emitters, not viable either. Hence, with neither frequency or pulse repetition interval prediction available, real-time agile-agile radar pulse sorting has not been possible in two-channel ESM systems.

Receivers like the LR-100 are particularly well adapted to use with an LBI, since LBI installations only require two antennas, and hence two receiver channels. The measured phase is highly ambiguous since the LBI baseline can be hundreds or even thousands of RF carrier wavelengths long, i.e., integer n 104, FIG. 1, is unknown and possibly very large. This integer n 104 is unknown because the receiver can only measure phase within a cycle (equivalently $2\pi$ radians or 360°), but many cycles $n_m$ of phase are typically associated with the signal spatial angle-of-arrival 136. The number of cycles is a function of the antenna separation, or baseline length d 137, and is proportional to the number of wavelengths at the signal frequency 102 in d. In contrast to the single LBI baseline hundreds of wavelengths long, a conventional short-baseline-interferometer, or SBI, has several baselines, each with antennas spaced at most tens of wavelengths apart. The SBI uses comparisons between phase measurements made across this multiple set of short baselines during a single dwell to resolve the phase cycle ambiguities. But the long LBI baseline cannot be conveniently phase-calibrated like the SBI; also the antennas forming the LBI are so widely separated that they usually cannot be phase-error-nulled, or clocked and boresighted. Not calibrating the antenna-to-receiver cables or clocking and boresighting the antennas introduces a potentially large bias error into the phase measurements. Thus LBI based applications must use phase measurement differences rather than single phase measurements like the SBI, so that these bias errors cancel in the differenced measurements. In previous applications, e.g. Kaplan U.S. Pat. No. 4,734,702 and the applicant's U.S. Pat. No. 5,343,212 discussed below, the differencing occurred across receiver dwells.

The use of this dwell-difference approach in past LBI applications has generally involved passive emitter location. When the LBI is used for passive location, if there is no significant aircraft attitude change between dwells all bias errors are essentially dwell-to-dwell constant and hence cancel almost totally for fixed-frequency emitters. When the LBI phase difference measurements have been used to locate emitters in range, as described in Kaplan, U.S. Pat. No. 4,734,702, and Rose et al in U.S. Pat. No. 5,343,212 the ambiguity resolution was accomplished as part of the location process (Rose) or by predicting the cycle integer using SBI outputs (Kaplan). This invention extends the use of LBI phase differences to monopulse sorting of both moving and fixed emitters. But, as noted, unlike previous applications of the LBI the invention does not involve locating the emitter in range. Since the invention does not involve emitter location in range, and explicitly avoids the need for an SBI, it requires a different approach from that of Kaplan or Rose to resolve the phase difference ambiguity.

Note that that this ambiguity resolution is required, i.e. the LBI ambiguous differential phase 112 (FIG. 1) by itself is not an agile emitter sorting parameter. The differential ambiguous phase does not provide pulse-to-emitter linking if the frequency associated with the sequential phase measurements varies, because this phase involves the product of two parameters: frequency and cos(aoa). When the cycle uncertainty 104 is added to this, in a dense emitter environment there will be many incorrect associations since many emitters at diverse frequencies and relative bearings will map, within system errors, into the same ambiguous phase difference.

SUMMARY OF THE INVENTION

Thus, it is an object of the present invention to monopulse dehop frequency agile radar pulses using both estimates and predictions of the cycle integer resolving two channel ambiguous differential phase measurements made on an LBI baseline by synthesizing an equivalent short baseline interferometer from the LBI.

Hence it is a further object of the present invention to extend the technique of forming the equivalent array from a conventional SBI to generating a synthesized short baseline interferometer (SSBI) from the LBI.

In the invention the LBI phase difference ambiguity integer 138 is used as the main discriminate. Computing the integer effectively separates the frequency-cos(aoa) product, and also separates this product from the cycle uncertainty. The way this sorting parameter is found, independent of SBI measurements (Kaplan), or a location hypothesis test (Rose), and the method by which it eliminates the deficiencies in processing agile and agile-agile signals, and further allows the ultimate use of LBI phase difference measurements 112 as an additional screening gate.

The present invention extends the method disclosed in the applicant's patent application "Method of Detection and Determining Angular Location of Frequency Agile Emitters", Ser. No. 09/487,209, filed Jan. 19, 2000, which is hereby incorporated by reference in its entirety into the present specification. The invention disclosed in Ser. No. 09/487,209, provides real-time (rather than off-line) monopulse frequency agile pulse sorting that guarantees contiguous pulses from the agile radar will be captured, while drastically limiting the inclusion of extraneous pulses from other radars in the same frequency band. The linking of frequency agile pulses is called dehopping. The present invention uses a phase measurement ambiguity integer (104, FIG. 1), and ambiguous pulse phase difference measurements 112 to dehop. The ambiguous phase measurements utilized in the aforementioned patent application entitled "Method of Detection and Determining Angular Location of Frequency Agile Emitters" were made on a set of calibrated interferometer baselines in a single dwell. The present invention requires only a single interferometer baseline, and phase measurements on that interferometer baseline can have large unknown frequency-independent bias errors since differences 112 $\Delta\phi, \ldots \Delta\phi_{m-1}$ between individual phase measurements are used.

As will be seen, the current invention overcomes the deficiency with two channel ESM systems that have frequency or pulse repetition prediction available. The present invention allows a single interferometer phase measurement made by receivers like the LR-100, to be used monopulse dehop, rather than requiring the simultaneous multichannel phase measurements previously needed. That is, the invention solves both the agile and agile-agile sorting problems with ambiguous monopulse phase measurements made on a single interferometer baseline. Both practically and theoretically, the best type of interferometer to use for making the phase measurement is an LBI, or long-baseline-interferometer. The LBI is the best practically because it is usually the least costly interferometer to implement. It is the best theoretically, because the invention utilizes the extensive LBI baseline length in implementing the dehop method.

In the current invention, which is a novel application of the LBI in the sense that it does not involve passive emitter ranging, the antenna-induced bias errors remain phase measurement update-to-update constant, but the antenna-to-receiver cable length differences produce a bias dependent on the signal frequency. This frequency-induced bias error does not cancel for agile emitters. It must be controlled to prevent gross errors when resolving the cycle ambiguities in the current invention.

Another object of the present invention is to use a phase measurement ambiguity integer and ambiguous pulse phase differences to dehop.

Yet another object of the present invention is to use only a single interferometer baseline which can include large unknown frequency-independent bias errors.

Still another object of the present invention is to use a single interferometer phase measurement rather than requiring simultaneous multi-channel phase measurement.

Yet a further object of the present invention is to solve both the agile and agile-agile sorting problems with ambiguous monopulse phase measurements made on a single interferometer baseline.

Yet still another object of the present invention is to use the accuracy of a resolved LBI aoa measurement in sensor coordinates to precisely predict an ambiguity integer associated with ambiguous phase measurement of the next pulse detected by a receiver at the measured frequency.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
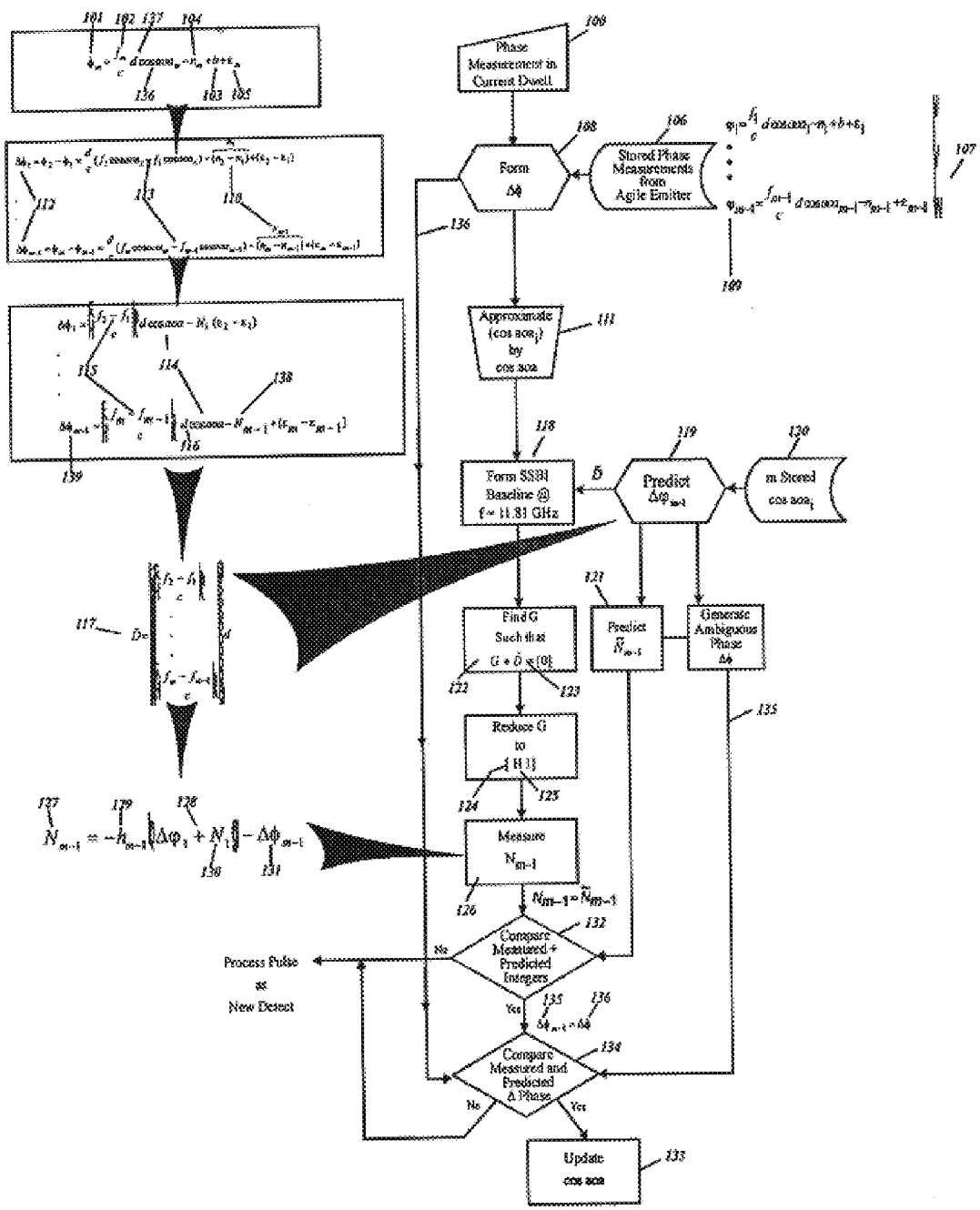
FIG. 1 illustrates the logical steps and processing that comprise the method of this invention.

The required modification of the subject matter disclosed in Ser. No. 09/487,209 takes two forms. The first is the use of phase differences 112 (FIG. 1) between frequency changes, and hence frequency difference measurements 115 rather than frequency measurements 102 in determining the SSBI baselines. The second modification is the use of an ambiguity integer 130 found on the first synthesized baseline to predict all subsequent ambiguity integers from all future differenced phase measurements made in the moving time window. This is a key aspect of the invention. After the first two-baseline SSBI is formed and resolved, the initial cycle integer on the first baseline determines all subsequent ambiguity integers, and in particular that of the most recent frequency-change-associated pulse measured. Thus SSBIs with a quite large number of baselines, able to generate very precise cos(aoa) estimates, can be efficiently produced. The SSBI generated from the LBI can have fifty or more baselines.

Constructing these baselines, and measuring the test ambiguity integer 130 for the last pulse, is well within the monopulse sorting timeline restriction, which may allows only microseconds to estimate sorting parameters and use them to gate the pulse. The sorting parameters are the ambiguity integer predicted 121 by the estimated cos(aoa) and the integer measured 127 utilizing the initial ambiguity integer 130. The gate that determines whether the new pulse is from the frequency agile emitter is by comparison of these two integers.

Two time scales are involved in this interaction of angle estimation and ambiguity cycle comparison. The sorting parameter updates, i.e. measurement of the ambiguity integers, occur in less than pulse repetition interval (PRI), while the SSBI estimate of cos(aoa) is generated with LBI phase measurements made in a time window typically extending over many PRI. For a pulse-to-pulse agile emitter, new SSBI baselines are added after each pulse update, but also old baselines may be dropped. Baseline deletion is a function of the potential change in cos(aoa), which may be bounded from navigation system (NAV) data. (Please explain) The SSBI associated with a given cos(aoa) is equivalent to a conventional, calibrated interferometer at a fixed frequency, with the phase difference measurements assumed to be conventional phase measurements. A numerically convenient value for the magnitude of this fixed frequency is the magnitude of the speed of light when expressed in the units measuring LBI length per second, i.e. about 11.81 GHz when working with inches. As noted, SSBI baselines can be added at the pulse repetition frequency if the emitter is pulse-to-pulse frequency agile. Because a large number of baselines may thus be used, the synthesized SBI, or SSBI, can achieve a high aoa measurement accuracy even though each individual baseline is short, by utilizing measurements on all the baselines in an optimal processing algorithm, such as a maximum likelihood estimator. This angle accuracy is exploited in the monopulse-dehopping portion of the processing.

The present invention uses the accuracy of the resolved LBI aoa measurement in sensor coordinates to precisely predict 121, FIG. 1, the ambiguity integer associated with ambiguous phase measurement of the next pulse detected by the receiver at the measured frequency. This aspect of the present invention, and the method used to perform the pulse sort, are best understood by systematically stepping through the logic flow diagram in FIG. 1.

The pulse phase measurements 100 are made in a wideband dwell. The pulse phase 101 is at frequency 102, and has an unknown bias 103 as well as an unknown ambiguity integer 104. In FIG. 1, the phase is measured per cycle, with thermal noise error 105. If the pulse belongs to the frequency agile emitter being dehopped, i.e., the pulse belongs in the set 106, then the $\cos(\text{aoa})_m$ term 136 associated with phase measurement 101 approximates those in the set 107. But this is not known to be true until the further processes and test shown in FIG. 1 are completed.

Process 108 is the first step in determining if the pulse associated with phase 101 belongs with the set of pulses associated with phases 107. In step 108, the measured phase 101 is differenced with phases from the set 107. In the case illustrated the phase being tested is differenced with the last phase 109 associated with the agile emitter. The other phases are also differenced 112, eliminating the bias error 103, and modifying the ambiguity integers to form a new integer set 110.

The next step, process 111, is fundamental to the method of the invention. In step 111, assuming all aoa to be the same, resulting in 114, approximates the quantities 113. Now the frequency differences 115 can be combined with the interferometer baseline 116 to form a new set of equivalent baselines 117. These baselines form the SSBI 118, which is manipulated as a standard interferometer measuring phases 112 for a signal at a frequency in GHz equal in magnitude to the speed of light in units of length per second (here inches per second).

The SSBI baselines 117 are fundamental both to resolving the ambiguities 110 and predicting 119 the unambiguous phase that should be measured based on the moving window average of the $\cos(\text{aoa})_i$ 120 associated with the phase set 107. This predicted phase is "modulo'd" down 121, in this case modulo 1 cycle, to obtain the predicted ambiguity integer $\hat{N}_{m-1}$.

The SSBI baselines 117 are also intrinsic to finding 122 a matrix of numbers G with the property 123 that matrix multiplication of G times the SSBI baselines results in the zero matrix. The method used, and the approach to generating 134 the new ambiguity integer in process 126, is an extension to the frequency-differenced phase measurements 112 of that presented in the present inventor's patent application "Detection and Location of Frequency Agile Emitters". This extension is necessary to allow the calculation of the ambiguity integer 127 to occur in microseconds. Therefore, after G is constructed, it is then row reduced to the form 124 where 125 H is a column vector and I an identity matrix. The ambiguity integer 127 can then be measured from the vector of actual phase differences using the correct element 129 from the column vector 125 multiplied by the initial resolved phase 128, with current ambiguous measured phase 131 simply added. If correctly implemented, this addition is the only computation that must be done after forming the phase difference 139, and this makes the use of 127 as a monopulse sorting gate feasible.

The correct implementation is as follows. Note the first measured ambiguous phase has been resolved 128 by the ambiguity or cycle integer $N_1$. If the phase differences 112 involving the phases 107 are always done with the same elements, then integer $N_1$ 130 is fixed for a given time window and does not have to be recomputed. This is the most desirable implementation of process 126, since as the SSBI is iteratively built and m becomes large, every new baseline ambiguity integer is a function of the initial one found. This simple dependency ensures that the new integer can be found in real-time rapidly enough to allow monopulse sorting. $N_1$ may be found initially by a number of techniques, most of which involve non real-time processing. The preferred method for obtaining $N_1$ is to utilize the initial non monopulse phase-linking method described in the applicant's patent disclosure "Detection and Location of Frequency Agile Emitters", extend to baselines of the form 117.

Once the ambiguity integer 127 associated with phase difference 139, and hence the most recent phase measurement 101 is estimated 126, it is compared 132 with the predicted integer generated in process 121. This integer is generated by multiplying the cos(aoa) 111 and the synthesized baselines 117 to predict the unambiguous phase. This comparison is the primary gating check. But if the integers are the same, a further test 134 compares predicted ambiguous phase 135 and measured ambiguous phase 136. If the phases match to within the estimation and measurement error, the pulse associated with phase 101 is added to set 106 at 133 where cosaoa is updated. If the phases are not the same, even though the ambiguity integers are, the new pulse cannot be from the same frequency agile emitter and the pulse is processed as a new detect.

From the above description it is clear that the present invention introduces a new sorting parameter, the ambiguity integer 138 associated with LBI phase difference measurements, that does not depend on the emitter having a stable PRI, and is relatively insensitive to noise 105.

Figure 2:
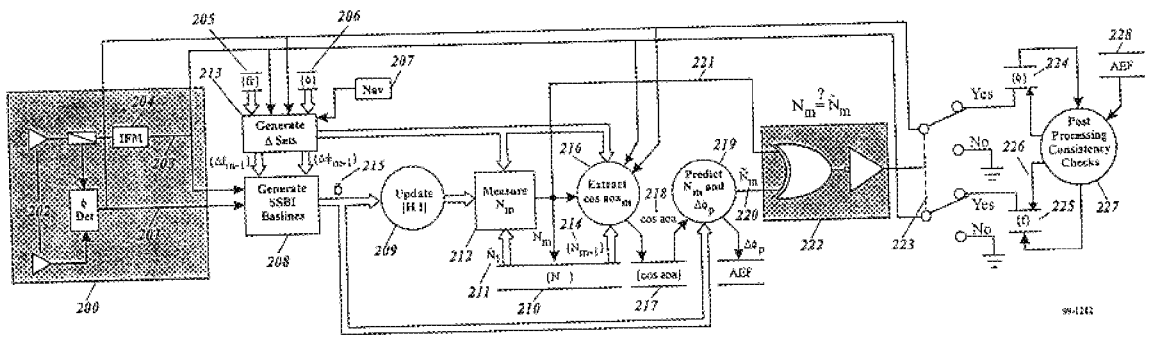
FIG. 2 illustrates the system interfaces and interaction between the measurements and monopulse gating functions.

FIG. 2 is a block diagram of the invention showing the required system interfaces and interconnections. A two channel receiver 200 between the LBI antennas 202 makes phase measurements 201. Note, unlike passive location LBI applications, the frequency dependent phase measurement errors on the baselines must be controlled. The simplest way to do this is to ensure the cables are the same length, have the same relative dielectric constant, and that each channel has identical components. This is assumed for the system shown. But calibration can also be used. When calibration is used it is best to down convert the signal to IF at the antennas, and to use a CW (continuous wave) source covering the maximum frequency excursions of the worse-case agile emitter. The CW source injects signals at both LBI antennas, and these signals can then be used to perform channel-to-channel frequency calibration using well established procedures.

When the emitter is detected, an IFM 204 measures the emitter frequency 203, typically to megahertz accuracy or better. Frequency 205 and phase 206 measurements already associated with the agile emitter are stored, and used with attitude and velocity updates from the NAV system 207 to determine the particular subset (106 and 107 FIG. 1) used in generating 208 the SSBI baselines. The preferred method for doing this is to store the baselines formed by the associated phases and frequencies in memory, and to only compute a new baseline utilizing the frequency 203 and phase 201 being tested. Similarly with process 209, in implementing G and reducing to the form 124 (FIG. 1) the preferred approach is to iteratively update the previously computed and stored value.

The ambiguity integers associated with the previous baselines formed from measurements 205 and 206 are store 210. Only the first integer 211 is required to compute 212, the latest integer, if the baselines in controller 213 are correctly chosen. But all previous integers 214 associated with the current baselines 215 are required to update (216) the aoa. However, this update can occur between pulse frequency measurements.

The cos(aoa) associated with the previous baselines are stored 217, and a value 218 from this set, which may be the last estimate, or a moving window average over previous estimates, is used 219 to predict the latest ambiguity integer. This integer 220 is compared with the measured integer 221, typically in hardware 222. The XOR and inverter gates are meant to pictorially, not rigorously, indicate a logic implementation that, for the LR-100 is best realized with a reconfigurable field-programmable gate array (FPGA). It is also desirable to implemented elements of 208, 209 and 212 in the FPGA. But processes 208 and 209 also involve floating point division, which is most efficiently done with a parallel multiplier outside the programmable gate array. This parallel multiplier can be a processor having a hypercube architecture and distributed memory. In the IFM 204, both FPGA and multiplier are mounted on a 6U size VMEbus card. Implementations in more advanced purely digital receivers, such as NextGen, will differ in detail, but make the same attempt to accomplish key processes in hardware rather than software to meet the monopulse sorting timeline requirement.

If the predicted and measured ambiguity integers are identical, then the phase and frequency are stored, 224 and 225. If not, the pulse does not belong to the agile emitter, and it is discarded 226. Clearly emitters measured 204 to the same frequency accuracy and lying along the same aoa cannot be distinguished in this processing. But this is true of any aoa-dependent scheme. The processing also cannot distinguish emitters at different frequencies and aoa producing, through the frequency-cos(aoa) product, the same ambiguous phase. Therefore the pulse sorting logic is necessary, but not sufficient, to this point. That is, all pulses from the agile emitter detected will be associated with the emitter, but some extraneous pulses also may be associated in the monopulse gating. These extraneous pulses are detected and eliminated 227 using other ESM parameters associated with the emitter in the Active Emitter File (AEF) 228. Process 227 includes the phase comparison 134 (FIG. 1). Comparison with the AEF parameters cannot typically be done monopulse, and so is always implemented as a post-gating check. Comparison of predicted and measured phase can be implemented either as part of the monopulse gating, as shown in FIG. 1, or post-gating check, as shown in FIG. 2.

In most practical cases there will not be many misassociations because of the angular resolution provided by the SSBI, coupled with the practical operational constraints on the radars. But the following example illustrates the intrinsic robustness of this gating method by neglecting such operational constraints and somewhat artificially creating SSBI ambiguous integer associations by using a very stressing scenario.

Figure 3:
FIG. 3 depicts a scenario more difficult to dehop then those typically encountered, used to stress the method, and hence help emphasize the use of both the ambiguous LBI phase differences 112, and the associated ambiguity integer 138 in doing the pulse sort.

Thus the test scenario shown in FIG. 3 provides an example of how the method of this invention can separate three identical frequency agile emitters A, B and C only 2.4° apart. The emitters are assumed to transmit a signal with an RF carrier centered at 16.5 GHz, but perturbed randomly in a 1.88 GHz bandwidth. The assumption is that the three signals from the three emitters are identical in frequency, and that the receiver detects the pulses from the three transmitters during the same dwell.

The LBI baseline 300 was 1268 inches, assumed installed as shown. The emitters, at a distance of 120 nm, were assumed to be detected at a typical receiver sensitivity threshold of 13 dB. The resulting phase thermal noise at this sensitivity, aircraft attitude errors, airframe vibration and residual frequency-dependent phase errors all combined to generate a phase measurement error with a standard deviation of 30°. The large phase error meant that predicted phase differences 135 (FIG. 1) matched the correct emitter's measured phase differences to a tenth of a cycle. The measured phase differences 112 (FIG. 1) are shown in Table I.

occurred well within this time span, occupying a time measured in microseconds rather milliseconds.

Although in this case the emitter shifted frequency pulse-to-pulse, other agile modes, such as batch-agile, present no additional problem. With a batch-agile emitter the frequency is constant over a number of pulses. These fixed-frequency pulses can be sorted using standard frequency discrimination, with the SSBI used when a hop occurs.

It will be readily seen by one of ordinary skill in the art that the present invention fulfills all of the objects as set forth above. After reading the foregoing specification, one of ordinary skill will be able to affect various changes, substitutions of equivalents and various other aspects of the invention as broadly disclosed herein. It is therefore intended that the protection granted hereon be limited only to the definition contained in the appended claims and equivalents thereof.

What is claimed is:

1. A method of associating a single pulse from an agile emitter with previously detected pulses from that emitter in a time interval less than the pulse repetition interval (PRI) of the radar comprising:

TABLE I

Test Results
Phase error 30°

| Emitter A | | | | Emitter B | | | | Emitter C | | | | SSBI array |
|---|---|---|---|---|---|---|---|---|---|---|---|---|
| measured | | predicted | | measured | | predicted | | measured | | predicted | | baseline |
| φ(deg) | N | φ(deg) | N | φ(deg) | N | φ(deg) | N | φ(deg) | N | φ(deg) | N | (inches) |
| 0.4327 | −15 | 0.4537 | −15 | 0.0263 | −14 | −0.0249 | −14 | −0.3326 | −13 | −0.4093 | −13 | 34.7008 |
| −0.4624 | 54 | −0.3946 | 54 | 0.3563 | 51 | 0.3222 | 51 | −0.0002 | 49 | 0.0596 | 49 | 127.5324 |
| −0.3589 | 22 | −0.4062 | 22 | −0.2406 | 21 | −0.2361 | 21 | −0.1931 | 20 | −0.1660 | 20 | 51.5516 |
| 0.2946 | −47 | 0.2443 | −47 | 0.1975 | −45 | 0.1948 | −45 | 0.2532 | −43 | 0.2001 | −43 | 111.2575 |
| −0.4832 | 12 | 0.4444 | 12 | 0.0475 | 11 | 0.0134 | 11 | −0.4594 | 11 | −0.4343 | 11 | 27.4342 |
| 0.3992 | 26 | 0.4261 | 26 | 0.3237 | 25 | 0.3370 | 25 | 0.1617 | 24 | 0.0920 | 24 | 62.8859 |
| −0.4828 | −67 | −0.4377 | −67 | 0.2666 | −65 | 0.2736 | −65 | 0.2369 | −62 | 0.2512 | −62 | 160.7514 |
| −0.3994 | 2 | −0.3812 | 2 | −0.4646 | 2 | −0.4770 | 2 | 0.4649 | 1 | 0.4883 | 1 | 3.8128 |
| 0.3543 | 40 | 0.2661 | 40 | −0.2898 | 39 | −0.3116 | 39 | −0.0661 | 37 | −0.0081 | 37 | 96.1284 |

The predicted (FIG. 1) 121 and measured 127 ambiguity integers matched exactly, even with the large phase error. But, as shown in the Table, there were cases where two emitters had the same ambiguity integer. This happened when the frequency hop was very small. A small frequency hop resulted in a comparatively short SSBI baseline; for example, 3.8128 inches in one case. Note that the 1268 inch LBI baseline length permitted pulses with such a small frequency change to be sorted. Emitter's A and B generated the same ambiguity integer for this baseline, but the ambiguous phase differed by much more than the prediction and phase measurement errors. This will generally be the case with practical angular separations. The ambiguous predicted and measured phases must differ to account for the angular separation when the ambiguity integers do not.

The use of predicted phase to separate emitters when the ambiguity integers were the same was possible because of the precise angular resolution achieved. This angular resolution was due to the large number of baselines in the SSBI array. Offline phase linking produced an initial 10 baseline array. This array and the subsequent arrays produce an aoa estimate accurate to within 0.05°.

The 10 baseline array occupied a time window of 100 msec. Thus aoa updates, i.e. changes in the aoa, are available for use by the system at about a 10 Hz rate. The PRI in this example was 9.8 msec. The monopulse gating calculations storing ambiguous phases from the previously detected pulses from the same agile emitter;

estimating a single cos(aoa) from a subset of the stored ambiguous phases;

detecting a new ambiguous phase $\phi_m$ at frequency $f_m$ which frequency is different from at least one of the frequencies associated with the phases in the stored set, the phase measurement made between two antennas spatially separated by distance d, forming a set of differenced phases and corresponding differenced frequencies from the stored set, with at least one member of this set being the difference of the new ambiguous phase and frequency with one of the stored phases and its associated frequency;

measuring the phase cycle measurement ambiguity integer resolving the phase difference formed from the new ambiguous phase utilizing this set of phase and frequency differences;

computing the phase cycle measurement ambiguity integer resolving the new at ambiguous phase difference if the new pulse is from the same emitter as the stored set by utilizing the previously estimated cos(aoa) and newly measured frequency $f_m$; and first comparing the measured and computed ambiguity integers, and associating the newly detected pulse with the previously stored pulses as being from the frequency agile emitter if the integers are equal.

2. The method of claim 1 where the integer measuring, computing and comparing steps occur before detecting a new ambiguous phase $\phi_{m+1}$ at frequency $f_{m+1}$ different from $f_m$.

3. The method of claim 1 where the integer measuring, computing and comparing steps are applied sequentially to a set of previously stored pulses not yet associated with the emitter.

4. The method of claim 1 comprising:
predicting the new ambiguous phase difference, correct if the new pulse is from the same emitter as the stored set, this prediction done utilizing the previously estimated cos(aoa) and newly measured frequency $f_m$;
second comparing the detected ambiguous phase with the predicted phase and
deleting the newly detected pulse from the stored set of pulses if the predicted and measured phase differences are not equal to within measurement and estimation tolerances.

5. The method of claim 4, wherein said predicting second comparing and deleting steps occur after said first comparing step is successfully completed.

6. The method of claim 2, comprising:
predicting the new ambiguous phase difference, correct if the new pulse is from the same emitter as the stored set, this prediction done utilizing the previously estimated cos(aoa) and newly measured frequency $f_m$;
second comparing the detected ambiguous phase with the predicted phase; and
deleting the newly detected pulse from the stored set of pulses if the predicted and measured phase differences are not equal to within measurement and estimation tolerances.

7. The method of claim 6, wherein said predicting second comparing and deleting steps occur after said first comparing step is successfully completed.

8. The method of claim 1, comprising:
estimating a set of pulse parameters for each pulse previously stored in the set, with frequency and pulse repetition interval being possible members of the parameter set, these parameters being invariant from pulse-to-pulse within measurement and estimation tolerances;
estimating these pulse parameters for the newly associated pulse,
comparing the newly estimated pulse parameters with the previously estimated pulse parameters; and
deleting the newly associated pulse from the set if the parameter match does not satisfy conventional Electronic Surveillance Measures (ESM) criteria for identifying the new pulse as being generated by the same emitter as those in the previously stored set.

9. The method of claim 8, wherein said estimating steps, comparing and deleting steps occur after said comparing step is successfully completed.

10. The method of claim 1, wherein for each phase $\psi_i$ measured between two antennas spatially separated by distance d, with bias error b, random error $\epsilon_i$, at angle-of-arrival $aoa_1$ having ambiguity integer $n_i$, the phase and frequency $f_i$ are related according to the equation $$\varphi_i = \frac{f_i}{c} d \cos(aoa_i) - n_i + b + \varepsilon_i.$$

11. The method of claim 10, comprising:
differencing pairs of the stored phases and generating a set of phase differences $\Delta\psi_k = \psi_p - \psi_m$ each with associated ambiguity integer $n_p - n_m$; and
estimating a single cos(aoa) for this set of phase differences such that the single cos(aoa) replaces the true $\cos(aoa_t)$ in the set of $\Delta\psi_k$ with minimum error in the approximate relation $$\begin{bmatrix} \Delta\varphi_1 \\ \vdots \\ \Delta\varphi_k \end{bmatrix} \cong \begin{bmatrix} f_s - f_t \\ \vdots \\ f_q - f_r \end{bmatrix} \frac{d}{c} \cos(aoa) - \begin{bmatrix} n_s - n_t \\ \vdots \\ n_q - n_r \end{bmatrix} + \begin{bmatrix} \varepsilon_s - \varepsilon_t \\ \vdots \\ \varepsilon_q - \varepsilon_r \end{bmatrix}.$$

12. The method of claim 10, wherein the estimating and approximating the cos(aoa) steps comprises determining exactly the ambiguity integers $N_i$ where $$\begin{bmatrix} N_1 \\ \vdots \\ N_k \end{bmatrix} = \begin{bmatrix} n_s - n_t \\ \vdots \\ n_q - n_r \end{bmatrix}.$$

13. The method of claim 12, comprising:
generating an array or matrix of numbers G from the measured frequency differences and LBI baseline such that $$G\vec{D} \cong \begin{bmatrix} 0 & \cdots & 0 \\ \vdots & \ddots & \vdots \\ 0 & \cdots & 0 \end{bmatrix}$$

where $$\vec{D} \cong \begin{bmatrix} f_s - f_t \\ \vdots \\ f_q - f_r \end{bmatrix} \frac{d}{c},$$

and
estimating the ambiguity integers $N_i$ according to the relation between the known measured phase differences and unknown integers $$G \begin{bmatrix} \Delta\varphi_1 \\ \vdots \\ \Delta\varphi_{h-1} \\ \Delta\varphi_h \end{bmatrix} = G \begin{bmatrix} N_1 \\ \vdots \\ N_{h-1} \\ N_h \end{bmatrix}.$$

14. The method of claim 13 wherein estimating the ambiguity integers step, and subsequently estimating the cos(aoa) step are both done using a maximum likelihood estimator.

15. The method of claim 12, wherein estimating the ambiguity integers step, and subsequently estimating the cos(aoa) step are both done using a maximum likelihood estimator.

16. The method of claim 1, comprising computing the phase cycle measurement ambiguity integer $N_{new}$ by resolving the new ambiguous phase difference $\Delta\psi=\psi_i-\psi_{new}$, if the new pulse is from the same emitter as the stored set, comprising:

predicting the resolved phase utilizing the estimated cos (aoa) and measured frequencies according to the approximation $$\Delta\varphi_{pred} = \frac{f_i - f_{new}}{c} d \cos(aoa), \text{ and}$$

predicting the ambiguity integer $N_{new}$ from this computed phase by means of the relation $N_{new}=\Delta\psi_{pred}\text{modulo}(1)$.

17. The method of claim 1, comprising:

generating G from the measured frequency differences and LBI baseline length such that $$G\vec{D} \cong \begin{bmatrix} 0 & \cdots & 0 \\ \vdots & \ddots & \vdots \\ 0 & \cdots & 0 \end{bmatrix}$$

where $$\vec{D} \cong \begin{bmatrix} f_s - f_t \\ \vdots \\ f_q - f_r \\ f_i - f_{new} \end{bmatrix} \frac{d}{c},$$

partitioning the array of numbers G to create two weighting sets $\vec{g}_m$, a single column of numbers, and $G_{m-1}$, where $$G=[G_{m-1}\ \vec{g}_m],$$

and measuring the ambiguity integer $N_{new}$ utilizing the phase differences, the frequency differences, and the previously found ambiguity integers according to $$\vec{g}_m N_{new} = \left( G \begin{bmatrix} \varphi_s - \varphi_t \\ \vdots \\ \varphi_i - \varphi_{new} \end{bmatrix} - G_{m-1} \begin{bmatrix} N_1 \\ \vdots \\ N_k \end{bmatrix} \right).$$

18. The method of claim 17 wherein the ambiguity integers and phase measurements are made to depend on only a single previously resolved stored phase, allowing measurement of the new ambiguity integer in $\mu$secs, resulting in the reduction of $\vec{g}_m$ to $$\begin{bmatrix} 0 \\ \vdots \\ 1 \end{bmatrix}$$

and comprising:

computational processing of G to the form $$G_{row\ reduce}=[H\ I]$$

where I is the identity matrix $$I = \begin{bmatrix} 1 & \cdots & 0 \\ 0 & \ddots & 0 \\ 0 & 0 & 1 \end{bmatrix}$$

and H is a column of numbers $$H = \begin{bmatrix} h_1 \\ \vdots \\ h_{m-1} \\ h_m \end{bmatrix}$$

and measuring $N_{new}$ by the single equation $$h_{m-1}(\Delta\psi_1+N_1)+(\psi_1-\psi_{new})=-N_{new}.$$

19. The method of claim 1, wherein the phase detection occurs on one of a set of calibrated conventional interferometer baselines, where the particular baseline used from the set may be different at each pulse update.

20. The method of claim 1 where the phase detection occurs on an LBI baseline, where the baseline is frequency calibrated but the two antennas forming the baseline may have different signal polarization responses.

* * * * *